United States Patent [19]

DeRouen

[11] 4,209,166
[45] Jun. 24, 1980

[54] UNIVERSAL JACK AND WORK POSITIONING MECHANISM

[76] Inventor: Adrian J. DeRouen, 101 W. Saltilla St., New Iberia, La. 70560

[21] Appl. No.: 42,500

[22] Filed: May 25, 1979

[51] Int. Cl.² ............................................. B25B 5/14
[52] U.S. Cl. ...................................... 269/71; 269/82; 269/104; 269/266; 269/296
[58] Field of Search ....................... 269/37, 45, 71, 75, 269/82, 104–106, 152, 265–266, 289, 296–198, 321 T

[56] References Cited

U.S. PATENT DOCUMENTS

| | | | |
|---|---|---|---|
| 979,305 | 12/1910 | Hunt | 269/45 |
| 1,465,330 | 8/1923 | Ardner | 269/45 |
| 2,045,307 | 6/1936 | O'Connell | 269/296 |
| 2,458,370 | 1/1949 | Geddes | 269/45 |
| 3,139,277 | 6/1964 | Mears | 269/296 |
| 3,602,492 | 8/1971 | Petrie | 269/296 |

FOREIGN PATENT DOCUMENTS 203296  2/1939  Switzerland ................................ 269/45

*Primary Examiner*—Robert C. Watson
*Attorney, Agent, or Firm*—Guy E. Matthews

[57] ABSTRACT

A universal jack and work positioning mechanism comprises a support structure having a base with a jack shaft being vertically movable relative to the support structure for vertical positioning of the work piece to be supported by the mechanism. An upwardly diverging cradle is connected to the shaft and is positioned to receive and provide primary support for a conduit work piece. A plurality of leveling arms extend from the lower portion of the cradle and orient various bottom and side positioning leveling screws in such manner that the tubular work piece is engaged at its bottom and side portions and is accurately positionable through manipulation of the leveling adjustment elements. A pivotal orienting element is supported by one of the leveling arms and is so manipulatable as to position a universal orientable adjustment element to various selective positions thus allowing adaptability of the mechanism for support and adjustment of different kinds of tubular work pieces such as pipes, tee fittings, 45° and 90° elbow fittings and the like.

15 Claims, 4 Drawing Figures

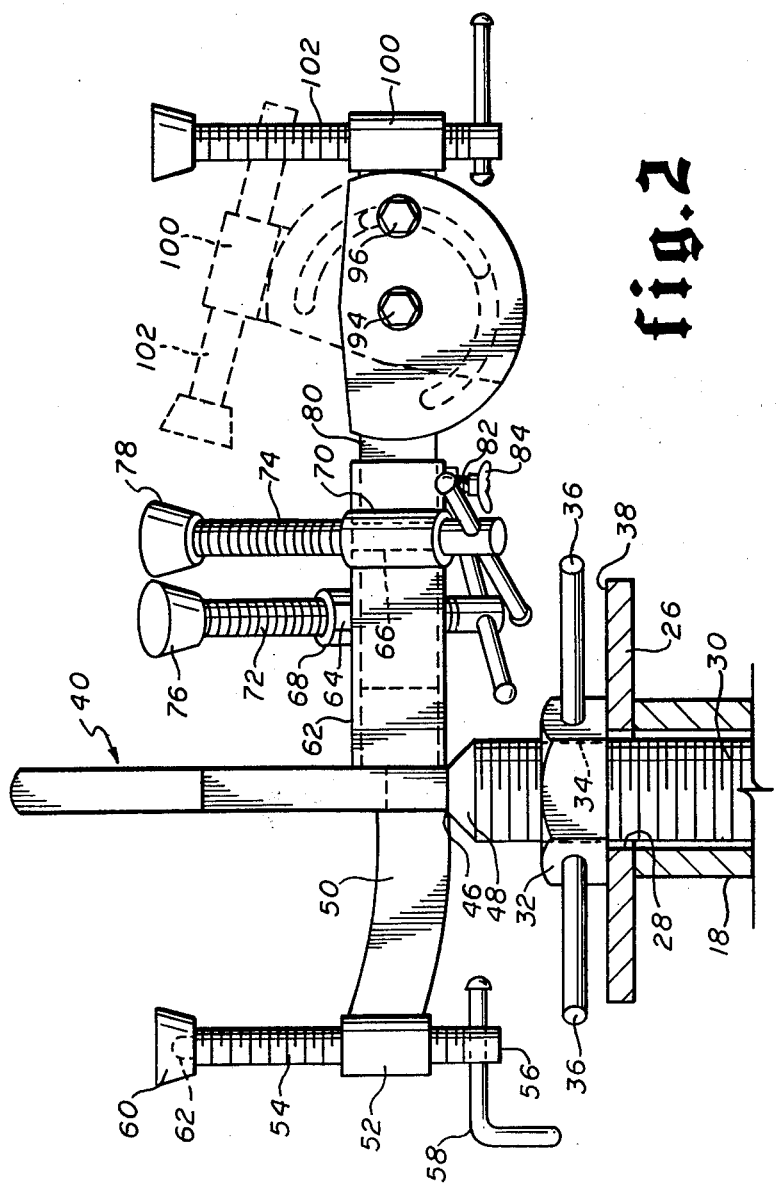
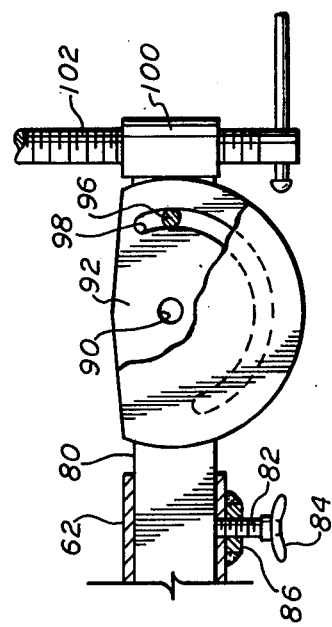
fig. 2
fig. 4

UNIVERSAL JACK AND WORK POSITIONING MECHANISM

FIELD OF THE INVENTION

This invention relates generally to support devices and, more specifically, relates to a universal support and positioning mechanism for supporting and accurately positioning conduit elements, such as various kinds of tubular fittings for welding operations.

BACKGROUND OF THE INVENTION

During the installation of fluid handling systems, such as pipelines and production control facilities for oil production, petroleum, chemical and petrochemical processing facilities, etc., flow lines are typically installed by bolting, threading or welding various sections or components of the flow line in assembly. Where the flow line components, such as pipe and pipe fittings, are connected by welding, it is necessary that the flow line components be very accurately positioned and supported at least until such time as the components are firmly interconnected during the welding process.

Pipe elements intended to be welded together are typically prepared for welding by machining beveled end surfaces thereon. Other flow line components having beveled end surfaces are then positioned in closely spaced relation, with the end surfaces being precisely parallel and the tubular walls being precisely coextensive. When positioned in this manner, the flow line components are then typically tack welded sufficiently to prevent inadvertent separation or misalignment of the components. After this has been done the welding operation is then conducted in such manner that weld metal completely fills a V-shaped groove defined cooperatively by the tubular flow line components to be joined.

When flow line fittings, such as tee fittings and elbow fittings, are manufactured, the various openings thereof are oriented in very precise manner. For example, the openings of a 45° or 90° elbow fitting are oriented at precisely 45° and 90°, respectively. Typically, welding operations are conducted only after the fittings have been precisely oriented with respect to other flow line components and with respect to the horizontal and vertical. When a fitting is properly oriented in conventional manner, a level may be placed against the opening and the leveling bubble of the level will be precisely centered. By carefully insuring that each flow line component is accurately positioned with respect to the horizontal and vertical, fluid handling apparatus can be simply and efficiently manufactured and the resulting fluid handling structure will not be subjected to any undue mechanical strain resulting from improper alignment of the various components thereof.

In order to accurately position pipe fittings such as tees and elbows, especially when such pipe fittings are of large and heavy nature, it is desirable to provide some suitable means for supporting the pipe fittings and for achieving proper orientation of the pipe fittings prior to tack welding and welding procedures. Elbow and tee fittings, however, are very difficult to position accurately for welding operations because of the unusual configuration thereof. Devices that function adequately for support of pipe sections therefore are typically completely inadequate for the purpose of supporting conventional tee and elbow fittings. Although special fitting support devices have been developed, these are typically unsatisfactory for general flow line fabrication for the reason that a number of different kinds of support devices are typically necessary. It is desirable, therefore, to provide a support mechanism for support of flow line components that is universally adaptable to various kinds of pipe fittings that are typically utilized for welding fabrication of fluid handling systems.

THE PRIOR ART

A number of different work holding appliances have been developed for use in supporting and orienting elements that are to be interconnected by welding. U.S. Pat. No. 2,669,958 of Sweeney shows a welder's work holding appliance with clamps that support sheet metal components that are to be connected by welding. One example of pipe positioning apparatus for welding operations is exemplified by U.S. Pat. No. 2,854,941 of Vollmer which shows a mechanism for supporting and orienting pipe sections of differing diameter. An exemplary pipe clamping device is shown by U.S. Pat. No. 3,718,327.

It is a primary feature of the present invention to provide a novel mechanism for supporting and accurately positioning conduit sections and components in order that welding operations may be carried out in simple and efficient manner.

It is also a feature of the present invention to provide a novel positioning and support mechanism for pipe welding operations wherein the mechanism is of universal nature and is readily adaptable for use in supporting and accurately orienting any one of a number of different conduit fittings and components such as pipes, tees, elbows, etc.

An even further feature of this invention concerns the provision of a novel mechanism for supporting and orienting pipe components which is simply and efficiently adjustable so as to provide accurate positioning of the pipe sections relative to one another and relative to the horizontal and vertical, thus promoting efficient fabrication operations.

It is an even further feature of this invention to provide a novel mechanism for supporting and orienting pipe sections and pipe fittings and which mechanism is of simple nature, is reliable in use and low in cost.

Other and further objects, features and advantages of this invention will become obvious to one skilled in the art upon an understanding of the illustrative embodiment about to be described and various advantages not referred to herein will occur to one skilled in the art upon employment of the invention in practice.

SUMMARY OF THE INVENTION

In one exemplary form of this invention, a universal jack mechanism for supporting and accurately positioning conduit means such as tubular conduit and conduit fittings in preparation for conduit welding operations comprises an elevatable jack stand having a universal jack head at the upper portion thereof. The universal jack head includes a cradle defined by a pair of upwardly diverging support bars connected in substantially V-shaped manner, which cradle provides primary support for the conduit or fitting to be positioned thereon. A bottom leveling arm extends outwardly transverse from the cradle and supports a bottom leveling adjustment element of the screw thread type which is adapted for engagement with the lower central portion of the conduit or fitting supported by the universal jack mechanism. Opposite the bottom leveling arm, a universal leveling arm extends outwardly from the pipe cradle and is angularly oriented with respect to a vertical plane defined by the cradle such that it defines an angle of less than 90° with respect to one side of the cradle and an angle exceeding 90° with respect to the opposite side of the cradle. A pair of opposed side adjustment arms extends transversely from the universal leveling arm and support a pair of side adjustment elements that are disposed in upwardly converging relation and are adapted to engage the lower side portions of the pipe or pipe fittings to be supported by the jack mechanism.

The universal nature of the jack mechanism of this invention is enhanced by the provision of a pivotal orienting element that is supported at the free extremity of the universal leveling arm and supports an orientable adjustment element. The pivotal orienting element is pivoted to orient the adjustment element supported thereby with respect to the pipe or pipe fitting being supported and positioned by the mechanism. The pivotal orienting element is adapted to be secured at a selected position in order that the adjustment element thereof may be manipulated so as to achieve accurate and easily controlled positioning movement of the pipe or pipe fitting.

BRIEF DESCRIPTION OF THE DRAWINGS

For a better understanding of this invention as well as other objects and further features thereof, reference is made to the following detailed description, which is to be read in conjunction with the accompanying drawings, wherein:

FIG. 2 is an elevational view of the universal jack mechanism of FIG. 1 illustrating the various parts thereof in greater detail and showing some components in broken line and section to illustrate positioning movement thereof.

FIG. 4 is a fragmentary, partially sectional view illustrating the construction of the fixed and movable plate assembly for achieving rotatable positioning of one of the adjustment and leveling elements of the mechanism of FIGS. 1-3.

DETAILED DESCRIPTION OF PREFERRED EMBODIMENT

Figure 1:
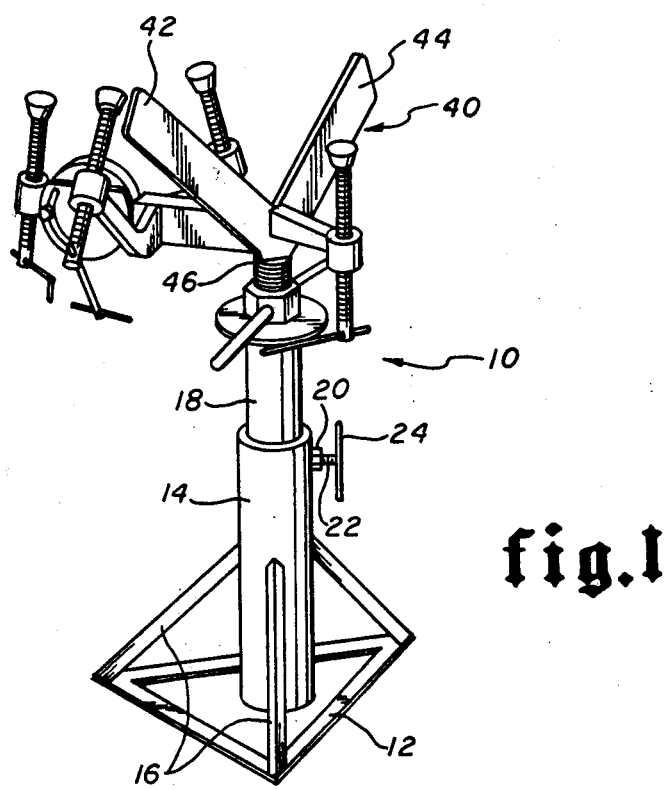
FIG. 1 is an isometric view of the universal jack mechanism of this invention.

Referring now to the drawings, and first to FIG. 1, a universal jack mechanism constructed in accordance with the present invention is illustrated generally at 10 and incorporates a generally triangular base 12 that provides support for an upright tubular column 14. A plurality of upwardly converging transverse support elements 16 are interconnected at the lower extremity thereof with the triangular base 12 and are fixed to the tubular column 14 intermediate the extremities thereof. An elongated support post 18, also of tubular form, is extended into the tubular column 14 and is positionable in telescoping manner relative to the tubular column. The support post 18 relates to the tubular column 14 in such manner as to define a coarse positioning adjustment for the universal jack mechanism. A lock device for securing the support post 18 at a desired position relative to the tubular column 14 may conveniently take the form illustrated where an internally threaded boss 20 is shown to be provided at the upper extremity of the tubular column. A threaded locking shaft 22 extends through the internally threaded boss into the tubular column 14 and is adapted to establish locking engagement with the tubular support post 18. A locking handle 24 connected to the locking shaft 22 may be manipulated in such manner as to tighten or loosen the locking shaft relative to the support post 18, thereby either locking or unlocking the support post 18 so as to allow or prevent vertical telescoping movement of the support post. Although the locking mechanism illustrated in FIG. 1 is of a particular form, it is not intended to limit the invention to the particular form shown. Any suitable locking mechanism that allows coarse telescoping adjustment of the support post 18 relative to the tubular column 14 may be utilized effectively within the spirit and scope of the present invention.

It is desirable to provide fine adjustment means for the purpose of achieving easily controlled accurate vertical positioning of the universal head portion of the jack mechanism. As illustrated in FIGS. 1 and 2, such fine adjustment means may conveniently take the form of a threaded adjustment acutator. The upper extremity of the post 18 may be provided with a wear plate 26 that may be welded or otherwise fixed to the upper extremity of the support post. The wear plate 26 is formed to define an internal opening 28 through which an externally threaded jack post 30 extends. To provide for controlled upward and downward movement of the jack post 30 an internally threaded drive element or drive nut 32 is formed to define an internally threaded aperture 34 that receives the threads of the jack post. At least one and preferably a plurality of elongated actuator handles 34 are fixed to the drive element 32 and are intended for manual movement. The actuator 32 bears on the upper surface 38 of the wear plate 26.

For the purpose of supporting work pieces, such as pipe and pipe fittings that are intended to be accurately positioned, it is desirable to provide a means for primary support and then to provide secondary support devices that are capable of leveling and positioning adjustment. In accordance with this invention, primary support for pipe and pipe fittings may conveniently take the form of an upwardly diverging cradle illustrated generally at 40 and being defined by a pair of inclined primary support arms 42 and 44 that are interconnected with one another at the lower portions thereof to define a generally V-shaped upwardly diverging cradle. The cradle 40 is secured at its lower portion or apex 46 to the upper portion 48 of the jack post 30. It is thus apparent that upon rotation of the internally threaded drive element 32 the jack post 30 and the cradle 40 will be raised or lowered as is necessary to achieve proper elevation of the pipe section or fitting being positioned for welding. The cradle or primary support element 40 is positioned such that it defines a vertical plane extending coincidental with the vertical axis of the threaded jack post 30 the tubular support post 18 and the column 14. The primary weight of the pipe section or fitting being supported will therefore be directed downwardly through the jack stand in proper manner, thereby insuring that mechanical loads are properly supported by the jack stand.

It is desirable to provide a plurality of secondary support elements that are adjustable so as to provide accurate leveling of the pipe or pipe fitting being positioned by the jack mechanism. A bottom leveling arm 50 is connected to and extends from the apex portion of the cradle 40 immediately above the upper portion 48 of the jack post. The support arm 50 is formed to define a generally cylindrical boss 52 at the free extremity thereof, which boss is internally threaded and receives the externally threaded portion 54 of a bottom adjustment screw 56. An adjustment lever 58 extends through an appropriate aperture formed at one extremity of the adjustment screw 56 to provide for manual rotation of the adjustment screw. In order to provide for optimum contact between the adjustment screw and the pipe section or fitting supported by the mechamism, a universal contact element 60 is movably fixed to one end of the adjustment screw 56. The universal contact element is formed to define a generally spherical receptacle receiving a spherical portion 62 of the adjustment screw, thereby allowing the contact element to have a certain degree of universal movement upon contact with the work piece being supported by the jack mechanism. The adjustment screw 56 contacts the bottom portion of the pipe section or pipe fitting and may be adjustably rotated in order to achieve accurate leveling of the work piece relative to the cradle.

It is also desirable to provide for lateral and side support for the conduit or fitting and such is provided in the manner illustrated in FIG. 2. A universal support arm 62 is connected to and extends from the apex portion 46 of the cradle 40 also immediately adjacent the upper portion of the jack post and opposite the bottom support arm 50. On opposite sides of the universal support arm 62 is provided a pair of transverse adjustment elements 64 and 66, each defining internally threaded bosses 68 and 70 at the free extremities thereof. Transverse adjustment elements 72 and 74 constructed and functioning in similar manner as adjustment screw 56 are received by the internally threaded bosses 68 and 70 the transverse support arms 64 and 66 are oriented with respect to the universal support arms 62 such that the cylindrical bosses 68 and 70 are oriented in angulated relationship with respect to the vertical and horizontal. By so positioning adjustment elements 72 and 74, the universal contact elements 76 and 78 provided thereon will be enabled to seek optimum supporting engagement with the particular work piece involved. The angulated relationship of the adjustment elements 72 and 74 also promotes universal applications of the jack mechanism to support of a wide variety of tubular fittings including tees, 45° and 90° elbows, as well as other pipe fittings.

In order to provide for even greater universal application of the support and positioning mechanism of this invention, the universal support arm 62 is shown to be of generally rectangular, tubular configuration and is adapted to receive a horizontal telescoping arm 80 that is extendable therefrom. The telescoped position of the arm 80 may be secured with respect to the universal support arm 62 by means of a locking element 82 that is driven manually by means of a wing nut 84 or the like. As shown in FIG. 4, locking element 82 may extend through an internally threaded boss 86 fixed to the outer periphery of the universal support arm 62. If desired, the boss 86 may take the form of a nut that is connected to the universal support arm 62 by welding or by any other suitable form of attachment.

Figure 3:
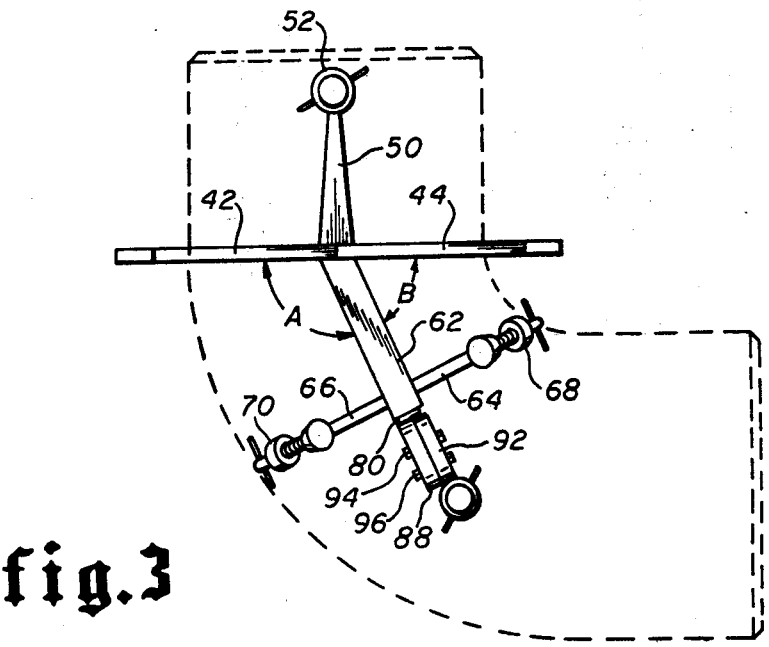
FIG. 3 is a plan view of the universal jack mechanism of FIGS. 1 and 2 illustrating in broken line a 90° elbow fitting positioned thereon for support and orientation.

It is important to note that the universal support arm 62 is angulated with respect to a vertical plane defined by the diverging support elements 42 and 44 of the cradle such that it defines an angle A of substantially greater than 90° with respect to support element 42 and an angle B of less than 90° with respect to support element 44 of the cradle. This angulated positioning of the support arm 62 relative to the cradle effectively positions the various adjustment elements of the support arm for proper engagement with the curved portion of certain kinds of pipe fittings. As shown in FIG. 3, for example, a 90° elbow fitting is shown to be supported by the universal jack mechanism and the various adjustment devices provided on the universal support arm 62 are properly positioned for supporting and adjustment engagement with the fitting such that the openings of the fitting may be properly positioned with respect to the horizontal and vertical.

For the purpose of providing support for certain kinds of pipe fittings, pipe sections and other such work pieces, it is desirable to provide an adjustment or leveling mechanism that is capable of assuming various positions with respect to the vertical and horizontal. In accordance with the present invention, such leveling and adjustment mechanism may conveniently take the form illustrated in the drawings where a first adjustment plate 88 is shown to be fixed to the free extremity of the telescoping shaft 80 such as by welding or the like and is shown to be of partially circular configuration. Plate 88 is formed to define a central aperture having registry with a central aperture 90 defined by a movable plate element 92 such as illustrated in the cut-away view of FIG. 4. A suitable bolt element or other pivot device 94 extends through the registering apertures of the fixed and movable plates 88 and 92 and functions to retain the plates in assembly. A second bolt element 96 extends through an aperture formed in the fixed plate 88 and also extends through an arcuate slot 98 defined in the movable plate 92. Bolt element 96 limits rotatable movement of the movable plate element 92 within limits defined by the length of the arcuate slot 98. As shown in the various figures, the arcuate slot 98 extends through an arc of approximately 180°, thereby allowing approximately 180° positioning movement of the movable plate relative to the fixed plate.

A generally cylindrical boss element 100 is fixed to the movable plate in any suitable manner and is formed to define internal threads that receive a threaded adjustment element 102. The adjustment element 102 is of the same character and function as the adjustment screw element 56. As shown in broken line in FIG. 2, the adjustment element 102 may be positioned at any selected position of rotation within limits defined by the length of the arcuate slot 98. For different kinds of pipe fittings, the movable plate 92 may be rotated so as to position the adjustment element or leveling screw 102 in order that particular adjustment support may be accomplished. In order to allow rotation of the movable plate 92 and the adjustment element 102, the locking bolt 96 may be loosened to release the plate 92 for freedom of rotary movement about the pivot bolt 94. After proper positioning has been accomplished, the bolt 96 will again be tightened, thereby locking the plates 88 and 92 in immovable assembly. The adjustment element 102 then may be manipulated so as to achieve the amount of movement necessary for proper positioning of the work piece engaged thereby.

In view of the foregoing, it is apparent that I have provided a novel universal jack mechanism that is capable of providing optimum support and accurate leveling adjustment for many different kinds of tubular work pieces such as pipe, various pipe fittings, etc. Primary support is provided by a cradle that is aligned with respect to a vertical support jack and leveling and proper positioning of the work piece is accomplished simply by manual manipulation of a plurality of adjustment screws that engage and impart positioning movement to the work piece. Through utilization of the mechanism of this invention, work pieces may be accurately positioned relative to other pipe structures and welding operations may be conducted with a minimum of assistance. It is, therefore, apparent that the present invention is one adapted to attain all of the objects and advantages hereinabove set forth together with other advantages which will become obvious and inherent from a description of the apparatus itself. It will be understood that certain combinations and subcombinations are of utility and may be employed without reference to other features and subcombinations. This is contemplated by and is within the scope of the present invention.

As many possible embodiments may be made of this invention without departing from the spirit or scope thereof. It is to be understood that all matters hereinabove set forth or shown in the accompanying drawings are to be interpreted as illustrative and not in any limiting sense.

I claim:

1. A universal jack mechanism for supporting and accurately positioning conduit means such as tubular conduit and conduit fittings in preparation for conduit welding operations, said mechanism comprising:
   a support structure having a base adapted to rest on a surface and an upright portion extending upwardly from said base; p1 a jack shaft being vertically movable relative to said support structure;
   a drive element at the upper portion of said support structure for accomplishing vertical movement of said shaft relative to said support structure;
   a cradle being connected to said shaft and positioned to receive and provide primary support for said conduit means to be positioned;
   a bottom leveling arm extending from said cradle and having a bottom leveling adjustment element supported thereby, said bottom leveling adjustment element being adapted for leveling and supporting engagement with the bottom of said conduit means;
   a universal leveling arm extending from said cradle;
   a pair of opposed side adjustment arms extending transversely from said universal leveling arm and having side adjustment elements supported thereby, said side adjustment elements adapted to have adjusting and supporting engagement with lower opposed sides of said conduit means;
   a pivotal orienting element being supported by said universal leveling arm and supporting an orientable adjustment element, said pivotal orienting element being pivotal to orient said orientable adjustment element relative to the fitting means being supported and positioned by said mechanism to provide desired support and facilitate adjustment of the position thereof; and
   means securing said pivotal orienting element at the selected position thereof.

2. A universal jack mechanism as recited in claim 1, wherein at least one of said adjustment elements comprises:
   an elongated threaded shaft;
   an internally threaded receptacle being defined by at least one of said arms and receiving said threaded shaft therein; and
   means for manually rotating said shaft, the threaded connection between said threaded shaft and said internally threaded receptacle causing linear adjusting movement of said shaft thus resulting in position adjustment of a conduit means supported and positioned by said mechanism.

3. A universal jack mechanism as recited in claim 2, wherein:
   universally orientable head elements are provided on said threaded shafts and become properly oriented upon being moved into supporting engagement with said conduit means.

4. A universal jack mechanism as recited in claim 1, wherein:
   said jack shaft is externally threaded;
   said drive element is an internally threaded drive nut, upon rotation of said drive nut the threaded interrelation between said drive nut and jack shaft causes vertical movement of said jack shaft to selectively raise and lower said conduit means.

5. A universal jack mechanism as recited in claim 1, wherein:
   said pair of side adjustment arms orient said side adjustment elements in upwardly converging relation.

6. A universal jack mechanism as recited in claim 1, wherein:
   said cradle is defined by a pair of upwardly diverging arms defining a generally V-shaped element;
   said universal leveling arm extends generally from the apex portion of said V-shaped element and is positioned at a horizontal angular relation of less than 90° from one of said diverging arms and an angular relation greater than 90° from the other of said diverging arms.

7. A universal jack mechanism as recited in claim 1, wherein said pivotal orienting means comprises:
   a fixed pivot element being secured in immovable relation to said universal leveling arm and defining a pivot; and
   a movable pivot element being pivotally supported by said fixed pivot element, said orientable adjustment element being supported by said movable pivot element and being positionable by pivotal positioning of said movable pivot element.

8. A universal jack mechanism as recited in claim 1, wherein said pivotal orienting means comprises:
   a fixed pivot plate being secured to an immovable relation to said universal leveling arm and having a pivot aperture formed therein;
   a movable pivot plate having said orientable adjustment element connected thereto and positioned thereby, said movable pivot plate defining a pivot aperture; and
   a pivot element extending through said pivot apertures of said fixed and movable pivot plates and securing said movable pivot plate in pivotal assembly with said fixed pivot plate.

9. A universal jack mechanism as recited in claim 1, wherein said securing means comprises:
   an arcuate slot being defined by one of said fixed and movable pivot plates;
   an externally threaded lock element extending from the other one of said fixed and movable pivot plates and extending through said arcuate slot;
   a lock nut being received by said lock element and being manipulatable from a locking position where said plates are locked in immovable assembly to a released position where said plates are free for relative pivotal movement.

10. A universal jack mechanism as recited in claim 9, wherein:
said arcuate slot extends through an arc of greater than 90°.

11. A universal jack head mechanism for supporting and accurately positioning conduit means such as pipe, pipe fittings and the like, said mechanism comprising:
a cradle having at least two upwardly diverging members for providing primary support for said conduit means;
a plurality of leveling arms extending from said cradle;
at least one leveling screw being supported by each of said leveling arms;
a fixed plate means being supported by one of said leveling arms and being formed to define pivot means;
movable plate means being pivotally supported by said pivot means and being rotatable relative to said fixed plate means;
locking means removably connected to said fixed plate means and to said movable plate means for selectively securing said movable plate means in immovable relation to said fixed plate means; and
an adjustment screw element being supported by said movable plate means and being selectively positionable by positioning of said movable plate means.

12. A universal jack mechanism as recited in claim 11, wherein:
one of said fixed and moveable plate means is formed to define an arcuate slot;
guide and locking means is received within said arcuate slot means allows rotation of said movable plate means within limits defined by the arcuate length of said arcuate slot means.

13. A universal jack mechanism as recited in claim 11, wherein:
said fixed and movable plate means are positioned in substantially vertically oriented manner.

14. A universal jack mechanism as recited in claim 11, wherein:
said leveling arm supporting said fixed and movable plate means is disposed in angulated relation with a plane defined by said cradle such that an angle of greater than 90° is defined with one side of said cradle and an angle of less than 90° is defined with the opposite side of said cradle.

15. A universal jack mechanism as recited in claim 11, wherein:
at least one of said leveling screws is positioned for engagement with the bottom of said conduit means; and
at least two of said leveling screws are positioned for engagement with the lower sides of said conduit means.

* * * * *